(12) United States Patent
Belser et al.

(10) Patent No.: US 6,496,943 B1
(45) Date of Patent: Dec. 17, 2002

(54) APPARATUS AND METHOD FOR EFFICIENT DEFECT MANAGEMENT IN A MAGNETO-OPTICAL DATA STORAGE SYSTEM

(75) Inventors: Karl A. Belser, San Jose; Gayle L. Noble, Boulder Creek, both of CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/241,795

(22) Filed: Feb. 1, 1999

Related U.S. Application Data (60) Provisional application No. 60/082,078, filed on Apr. 17, 1998.

(51) Int. Cl.[7] .................................................. G06F 11/00
(52) U.S. Cl. ........................................ 714/8; 369/53.17
(58) Field of Search ............................ 714/8, 5, 6, 769; 369/275.3, 47.14, 53.17

(56) References Cited

U.S. PATENT DOCUMENTS

| | | | | |
|---|---|---|---|---|
| 5,568,606 A | * | 10/1996 | Dobbek | 714/8 |
| 5,812,755 A | * | 9/1998 | Kool | 714/8 |
| 5,818,654 A | * | 10/1998 | Reddy | 360/53 |
| 5,835,930 A | * | 11/1998 | Dobbek | 711/4 |
| 5,923,491 A | * | 7/1999 | Kisaka et al. | 360/53 |
| 5,923,876 A | * | 7/1999 | Teague | 709/321 |
| 5,956,196 A | * | 9/1999 | Hull | 360/65 |
| 6,008,960 A | * | 12/1999 | Belser | 360/48 |
| 6,189,110 B1 | * | 2/2001 | Saitoh et al. | 714/710 |
| 6,223,303 B1 | * | 4/2001 | Billings et al. | 714/54 |
| 6,229,784 B1 | * | 5/2001 | Yoshimoto et al. | 369/275.2 |
| 6,233,108 B1 | * | 5/2001 | Inoue | 360/48 |
| 6,279,089 B1 | * | 8/2001 | Schibilla et al. | 711/111 |

* cited by examiner

Primary Examiner—Robert Beausoleil
Assistant Examiner—Bryce P. Bonzo
(74) Attorney, Agent, or Firm—Kirk A. Cesari; Derek J. Berger (57) ABSTRACT

An apparatus and method for efficient defect management in a magneto-optical data storage system store a map of current and predicted defective physical addresses of a recording disk, and then skips defective data wedges to more completely utilize the non-defective recording surface area available for a given track. The invention also stores groups of physical addresses that share defects to decrease the number of entries in the map of defective physical addresses, and also to increase the effective defect management capacity of existing hardware and software.

39 Claims, 12 Drawing Sheets

| ZONE TABLE INFORMATION FOR EACH DATA WEDGE |
|---|
| INNERMOST TRACK NUMEBR AND OUTERMOST TRACK NUMBER DEFINING THE ZONE — 800 |
| TOTAL NUMBER OF BYTES IN EACH DATA SECTOR — 802 |
| CLOCK FREQUENCY — 804 |
| COUNT FROM TRACK INDEX OF DATA SECTORS STARTED PRIOR TO THIS DATA WEDGE — 806 |
| NUMBER OF DATA SECTOR BYTES REMAINING FROM A PRECEDING DATA WEDGE — 808 |
| NUMBER OF NEW DATA SECTORS STARTED IN THIS DATA WEDGE — 810 |
| NUMBER OF DATA SECTOR BYTES IN THIS DATA WEDGE BEFORE A SPLIT (IF ANY) OCCURRED — 812 |

FIG. 8

| ZONE NUMBER | # OF DATA SECTORS PER # OF DATA WEDGES | UNUSED DATA WEDGES AT END OF TRACK |
|---|---|---|
| 0 | 1 / 1 | 0 (OR 1 TO GET SPARE) |
| 1 | 9 / 10 | 5 |
| 2 | 7 / 8 | 7 |
| 3 | 6 / 7 | 3 |
| 4 | 5 / 6 | 3 |
| 5 | 4 / 5 | 0 (OR 5 TO GET SPARES) |
| 6 | 3 / 4 | 3 |
| 7 | 5 / 7 | 3 |
| 8 | 9 / 13 | 8 |
| 9 | 2 / 3 | 0 (OR 3 TO GET SPARES) |
| 10 | 5 / 8 | 7 |
| 11 | 3 / 5 | 0 (OR 5 TO GET SPARES) |
| 12 | 4 / 7 | 3 |
| 13 | 7 / 13 | 8 |
| 14 | 1 / 2 | 1 |
| 15 | 4 / 9 | 3 |

APPARATUS AND METHOD FOR EFFICIENT DEFECT MANAGEMENT IN A MAGNETO-OPTICAL DATA STORAGE SYSTEM

CROSS-REFERENCE TO RELATED APPLICATIONS

This application claims the benefit of U.S. Provisional Patent Application Ser. No. 60/082,078, entitled "Second Level Defect Skipping Method," filed on Apr. 17, 1998, which is hereby incorporated by reference.

BACKGROUND OF THE INVENTION

1. Field of the Invention

This invention relates generally to computer memory devices and relates more particularly to efficient defect management in a magneto-optical data storage system.

2. Description of the Background Art

Reliable storage and retrieval of digital information is a significant concern for designers and users of computer systems. High capacity random access storage systems are often based on magnetic disk technology. Magneto-optical data storage systems offer many advantages over conventional magnetic data storage systems, but also have some unusual problems.

The recording materials used in magneto-optical data storage systems are chemically unstable and thus have different defect characteristics than recording materials used in magnetic data storage systems. Defects in magneto-optical recording materials are nominally circular and may grow in size by a factor of two over the life of the magneto-optical data storage system. Such defects therefore may damage or destroy more recording surface area long after manufacture. These unique complexities present additional problems in magneto-optical defect management. Hardware and software previously developed for magnetic data storage systems is generally incapable of managing defects with the unique characteristics (number, size, and growth) of magneto-optical recording materials. Efficient defect management in a magneto-optical data storage system therefore requires an improved apparatus and method.

SUMMARY OF THE INVENTION

In accordance with the present invention, an apparatus and method are disclosed for efficient defect management in a magneto-optical data storage system. In one embodiment of the present invention, a host computer sends a command via SCSI interface to write data and the data storage method sequence begins. The interface responsively writes the logical address and contents of each data sector to be stored into a memory. A microprocessor then scans the memory to determine if all data sectors have been processed. If not, the microprocessor chooses an intended physical address at which storage of each data sector is to begin. A search engine next scans a zone table and returns the physical address of a serviceable data wedge to the microprocessor. The contents of the zone table are initially determined at the time of magneto-optical data storage system manufacture, so that all defective data wedges may be identified and subsequently skipped to thereby eliminate read-after-write data verification delays.

Next, a read/write controller orders a servo controller to move the read/write head to the beginning of the serviceable data wedge. If a split (border between two data sectors) exists in the data wedge, the read/write controller waits for the split to arrive, and then sets a write gate signal to enable writing. If the end of the data wedge is reached, then the read/write controller disables the write gate signal and commands the servo controller to move to the next data wedge. If the end of a data sector is reached, then the read/write controller disables the write gate signal and the microprocessor updates the zone table. The method steps for reading data are analogous to the foregoing method steps for writing data.

The invention stores a map of the present and predicted defective physical addresses of a recording disk, and skips defective data wedges to more completely utilize the non-defective recording surface area available on a given track. The invention also stores groups of physical addresses that share defects. Storage of defect groups decreases the number of entries in the map of defective physical addresses and increases the effective defect management capacity of existing hardware and software. Therefore, the present invention more efficiently manages defects in a magneto-optical data storage system.

DETAILED DESCRIPTION OF THE PREFERRED EMBODIMENT

The present invention relates to an improvement in computer memory devices. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention includes an apparatus and method for efficient defect management in a computer memory device. The invention stores a map of current and predicted defective physical addresses of a recording disk, and then skips defective data wedges on the recording disk to more completely utilize the non-defective recording surface area available on a given track. The invention also stores groups of physical addresses that share defects. Storage of defect groups decreases the number of entries in the map of defective physical addresses and increases the defect management capacity of existing hardware and software.

Figure 1:
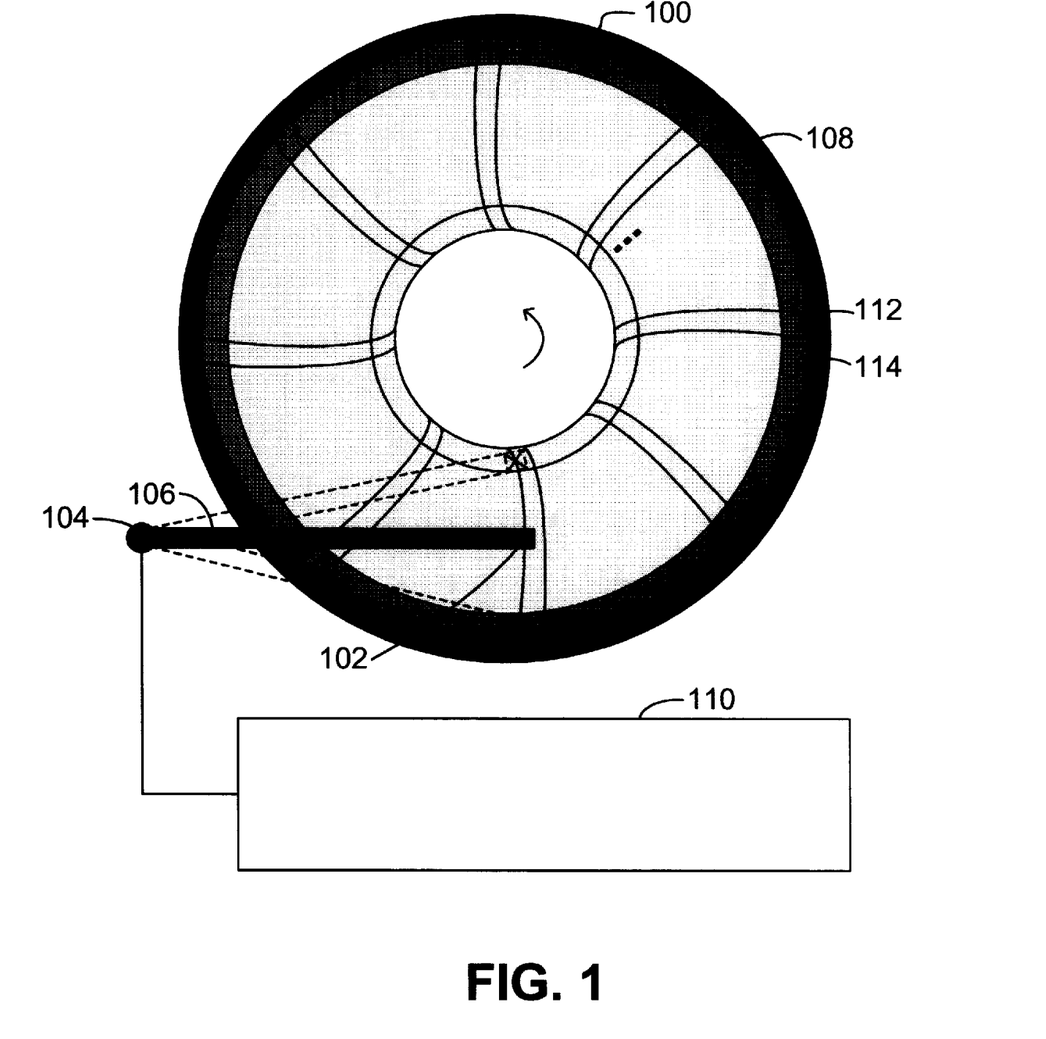
FIG. 1 is a diagram of an exemplary disk-based computer memory device.

Referring now to FIG. 1, an exemplary disk-based computer memory device is shown. Both magnetic and magneto-optical data storage systems often include a number of rotating recording disks 100 coated with a recording material. A read/write head 102 flies over recording disk 100, and a servo actuator 104 moves read/write head 102 via a servo arm 106 to a particular concentric track 108 on recording disk 100 in response to commands from a disk controller 110. Servo sectors 112 are portions of each track 108 including read/write head 102 alignment indicia and physical address information, and are distributed radially across recording disk 100. Data wedges 114 are the portions of recording material on each track 108 between servo sectors 112 where data is actually stored. Servo sectors 112 and data wedges 114 are normally sequentially numbered in a circumferential manner from an index (not shown). Tracks 108 are normally numbered sequentially in a radial manner. A physical address on recording disk 100 thus includes a particular track number and a particular servo sector number. In the widely-used "no id" prior art data architecture, physical address information is stored only in servo sectors 112, and not in datawedges 114.

Data communicated to and from a data storage system is normally managed by logical address rather than by physical address. Data sectors, which are numbered blocks of data to be stored and retrieved, are the fundamental units of data handled by the data storage system. Data sectors are usually of fixed length (for example, 512 bytes). If data wedges 114 are large, as is often the case with magnetic data storage systems, several logically addressed data sectors may be stored in a single physically addressed data wedge 114. The data storage system should therefore coordinate the logical address (data sector number) of a particular block of data to the physical address (track number and sector number) of the location at which the data is stored.

The coordination between logical addressing and physical addressing is complicated by defects in the recording material. Defects are portions of the recording material in which data cannot be reliably stored and retrieved. Defects should therefore be skipped, that is, no attempt should be made to either write to or read from them. Recording disks 100 are usually written to and then read back during manufacture, to determine which physical addresses are defective. A map is made between non-defective physical addresses and logical addresses. The resultant map is then maintained by the data storage system to accomplish proper defect skipping and thus provide reliable data storage and retrieval. The foregoing map is often stored on the recording disk 100 itself after manufacture, and multiple copies may be stored in different locations for redundancy.

Figure 2:
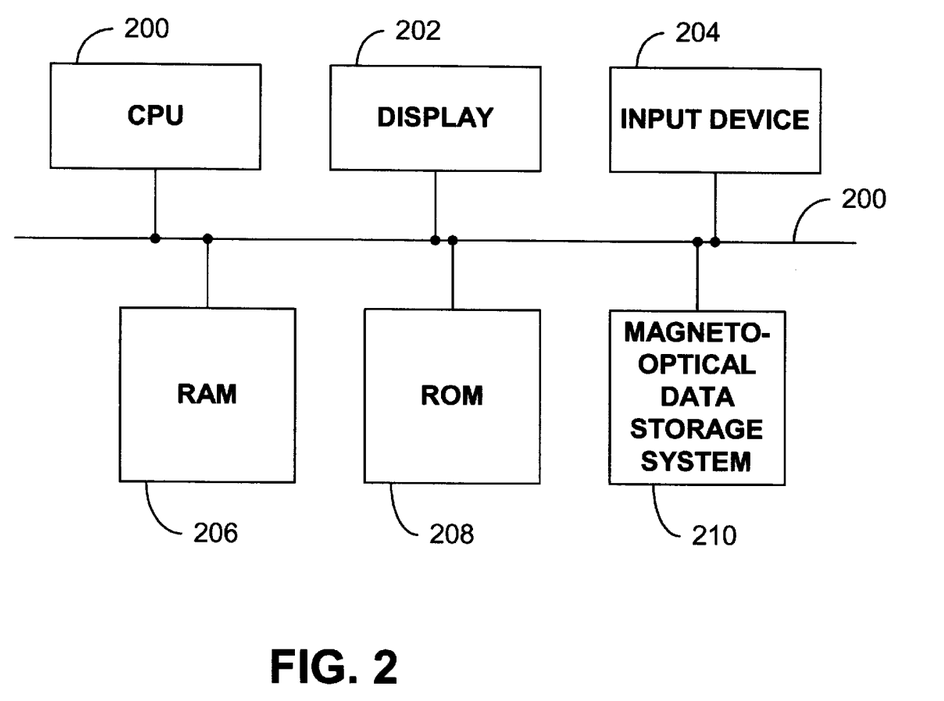
FIG. 2 is a block diagram of one embodiment of a computer system including a magneto-optical data storage system, in accordance with the present invention.

Referring now to FIG. 2, one embodiment of a computer system including a magneto-optical data storage system 210 is shown, in accordance with the present invention. A central processing unit (CPU) 200, a display 202, an input device 204, a random access memory (RAM) 206, a read-only memory (ROM) 208, and magneto-optical data storage system 210 are connected by a data bus 212. The computer system of FIG. 2 may be more broadly described as a host computer and magneto-optical data storage system 210 serving the host computer.

Figure 3:
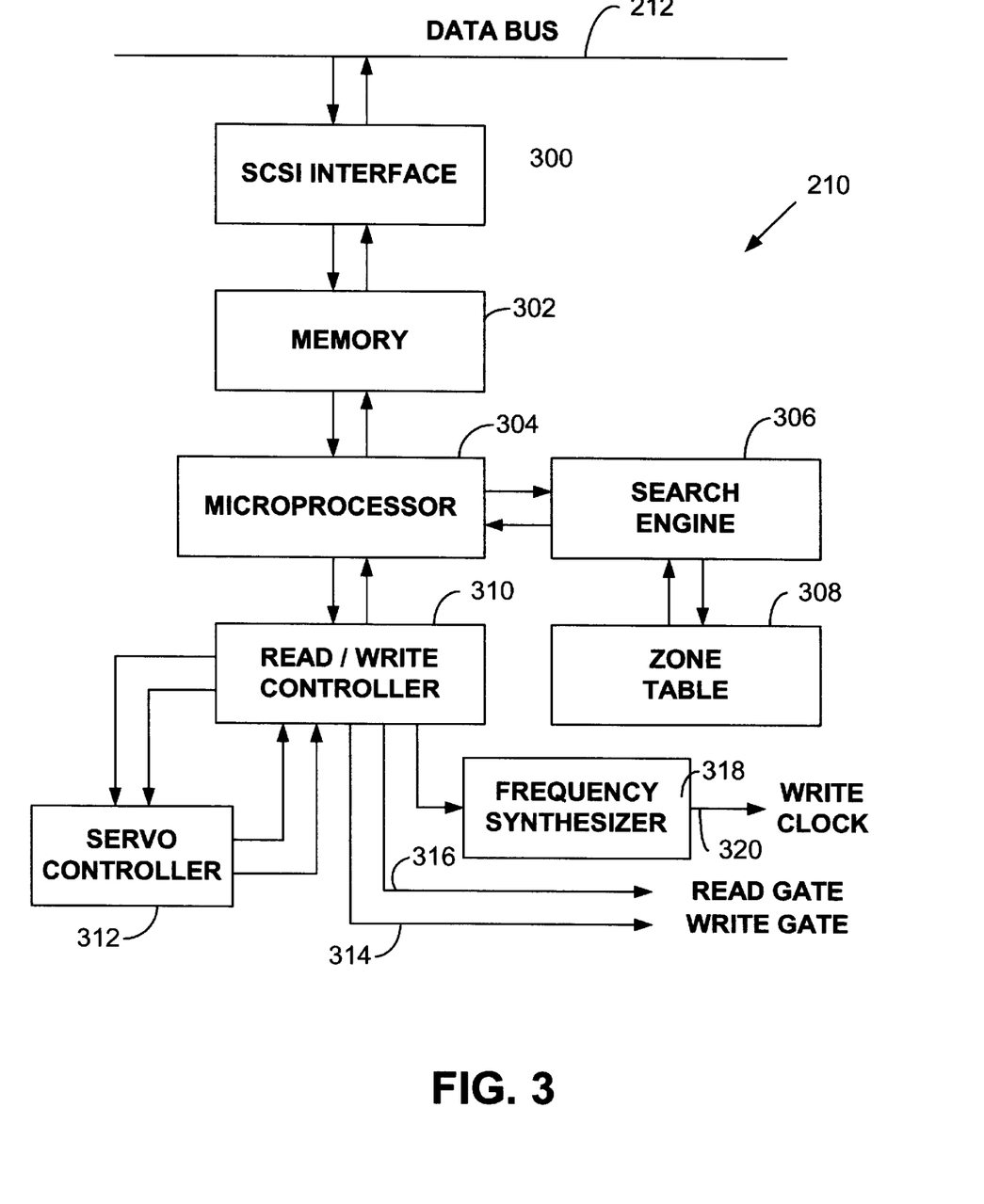
FIG. 3 is a block diagram of one embodiment of the FIG. 2 magneto-optical data storage system in accordance with the present invention.

Referring now to FIG. 3, one embodiment of magneto-optical data storage system 210 is shown, in accordance with the present invention. A SCSI interface 300 preferably manages communications between data bus 212 and magneto-optical data storage system 210. A memory 302 in magneto-optical data storage system 210 stores data sector logical addresses and content. In the preferred embodiment, a microprocessor 304 fetches the data sectors from memory 302 and requests a physical address at which the data storage process is to begin. A search engine 306 preferably scans a zone table 308 including information regarding defective physical addresses, to determine a non-defective physical address for microprocessor 304 by skipping all physical addresses known to be defective. Zone table 308 is often stored on recording disk 100 itself in multiple locations for redundancy. Zone table 308 may also be stored in nonvolatile memory other than recording disk 100.

Microprocessor 304 preferably transfers the physical address to a read/write controller 310, which then instructs a servo controller 312 to move read/write head 102 to a particular track number and a particular sector number. Once read/write head 102 is in correct position and alignment, read/write controller 310 sets a write gate signal 314 to enable writing. The process of reading back stored data is analogous, except that read/write controller 310 sets a read gate 316 to enable reading. A frequency synthesizer 318 produces a write clock signal 320 for writing. In one embodiment, frequency synthesizer 318 includes a phase-locked oscillator, an integer multiplier, and an integer divider, to produce write clock signal 320 of frequency $f=f_o * (n/m)$ where n and m are integers and $f_o$ is the phase-locked oscillator frequency. Different write clock signal 320 frequencies are required for different tracks 108, as will be described below.

Figure 4A:
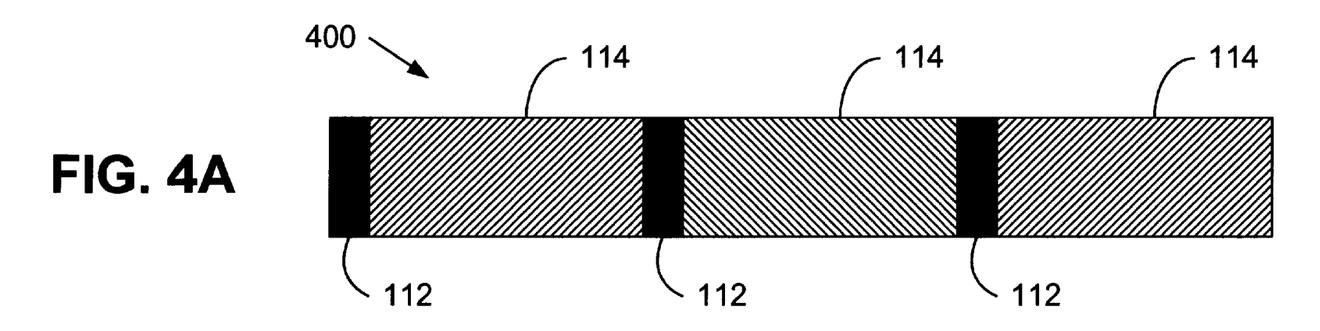
FIG. 4A is a diagram of an exemplary track on a recording disk including data wedges separated by servo sectors, in accordance with the present invention.

Referring now to FIG. 4A, an exemplary track 400 on recording disk 100 including data wedges 114 separated by servo sectors 112 is shown, in accordance with the present invention. Track 400 is depicted in a linear manner, and includes only three data wedges 114 and three servo sectors 112 for clarity. In this example, the length of each data sector corresponds to the length of each data wedge 114, so that precisely one data sector is stored in each data wedge 114. Three different data sectors may thus be stored in three separate data wedges 114. In the prior art, data wedges 114 are normally larger than data sectors, while in this example data sectors and data wedges 114 are the same size. Track 400 may store three data sectors altogether.

Figure 4B:
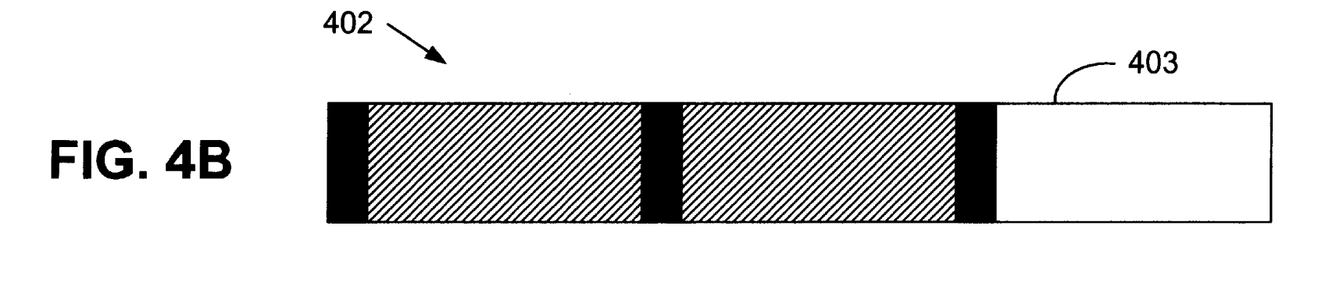
FIG. 4B is a diagram of another exemplary track on the recording disk including one data sector per two, data wedges, in accordance with the present invention.

Referring now to FIG. 4B, another exemplary track 402 on recording disk 100 is shown, in accordance with the present invention. In this example, the length of each data sector corresponds to the length of two data wedges 114, so that one data sector spans precisely two data wedges 114. Note again that in the prior art, data wedges 114 are normally larger than data sectors, while in this example data sectors are larger than data wedges 114. One data wedge 403 is left entirely unused on track 402 because a whole data sector cannot be fitted therein. Track 402 may therefore store only one data sector.

Figure 4C:
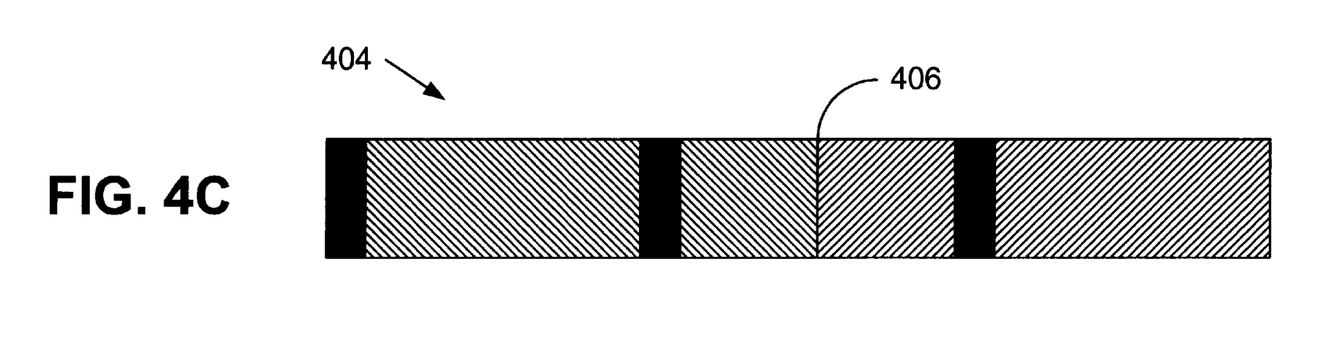
FIG. 4C is a diagram of a third exemplary track on the recording disk including two data sectors per three data wedges, in accordance with the present invention.

Referring now to FIG. 4C, a third exemplary track 404 on recording disk 100 is shown, in accordance with the present invention. In this example, the length of one data sector corresponds to the length of precisely one and one half data wedges 114. Track 404 may thus store two data sectors, but one data sector ends and another data sector begins within a data wedge 114. Such an occurrence, as illustrated in track 404, is termed a "split" 406. The magneto-optical data storage system 210 of the preferred embodiment stores all split 406 locations, because the beginning of a data sector does not necessarily correspond to the beginning of a data wedge 114 when splits 406 exist in tracks 404. Unused space (as in FIG. 4B) may be reduced or eliminated by allowing splits 406 to occur.

In prior art magnetic data storage systems, data wedges 114 on recording disk 100 are usually larger than a data sector. Therefore, in the prior art, if a defect exists on track 108, a portion of data wedge 114 equivalent to a data sector length is skipped to ensure reliable data storage and retrieval. In the preferred embodiment of the present invention, however, data wedges 114 are smaller but more numerous than in many prior art data storage systems. One or fewer data sectors fit into one data wedge 114 in the preferred embodiment. Skipping a data wedge 114 instead of an entire data sector length in the event of a defect is therefore a more efficient use of recording disk 100 area. Furthermore, entirely unused data wedges 114 may occur on many tracks 402, as shown in FIG. 4B, because a whole data sector cannot fit into the final data wedge 114 of track 402. These unused data wedges 114 are available for productive use as spares, to replace defective data wedges 114 elsewhere on track 402 without affecting the total number of data sectors that may be stored per track 402.

Figure 5A:
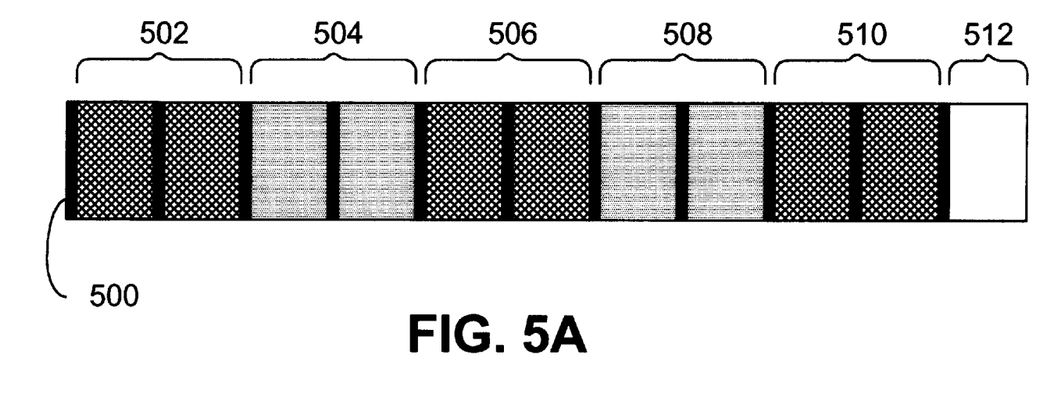
FIG. 5A is a diagram of one embodiment of an exemplary track on the recording disk without a defect, in accordance with the present invention.

Referring now to FIG. 5A, one embodiment of an exemplary track 500 on recording disk 100 is shown, in accordance with the present invention. For purposes of illustration, suppose that track 500 includes eleven data wedges 114 and each data sector requires precisely two data wedges 114 for storage. Five data sectors 502, 504, 506, 508, and 510 may thus be stored in ten data wedges 114, and one leftover data wedge 512 will remain unused at the end of track 500.

Figure 5B:
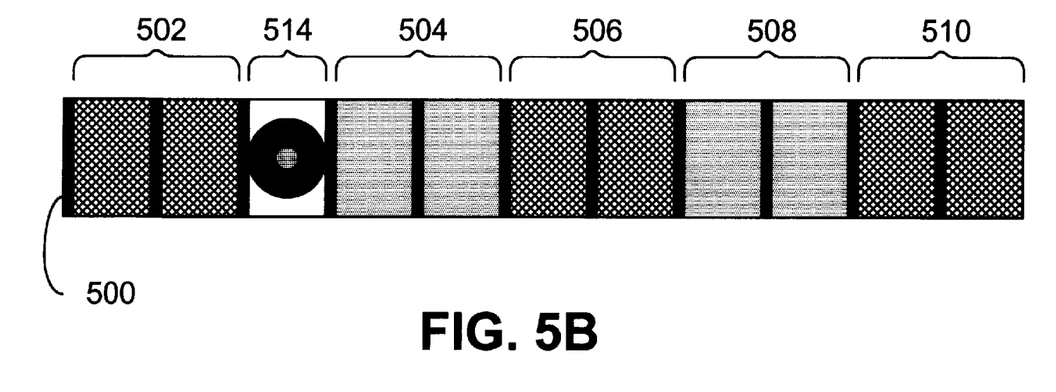
FIG. 5B is a diagram of one embodiment of another exemplary track on the recording disk including a defect and a skipped data wedge, in accordance with the present invention.

Referring now to FIG. 5B, one embodiment of another exemplary track 500 on recording disk 100 is shown, in accordance with the present invention. In this case, a defect 514 exists on track 500. Defect 514 may be actually present at time of manufacture or may simply be predicted to arise due to the known growth characteristics of such defects 514. In the preferred embodiment, during data storage, magneto-optical data system 210 skips the data wedge 114 marred by defect 514, and uses leftover data wedge 512 at the end of track 500 as a spare data wedge 114. No decrease in total useful track 500 capacity therefore results, because the leftover data wedge 512 now being used would otherwise have been left empty even if there were no defect 514. Data is effectively "shifted" toward the end of track 500 to use what would have been wasted storage space.

Figure 6:
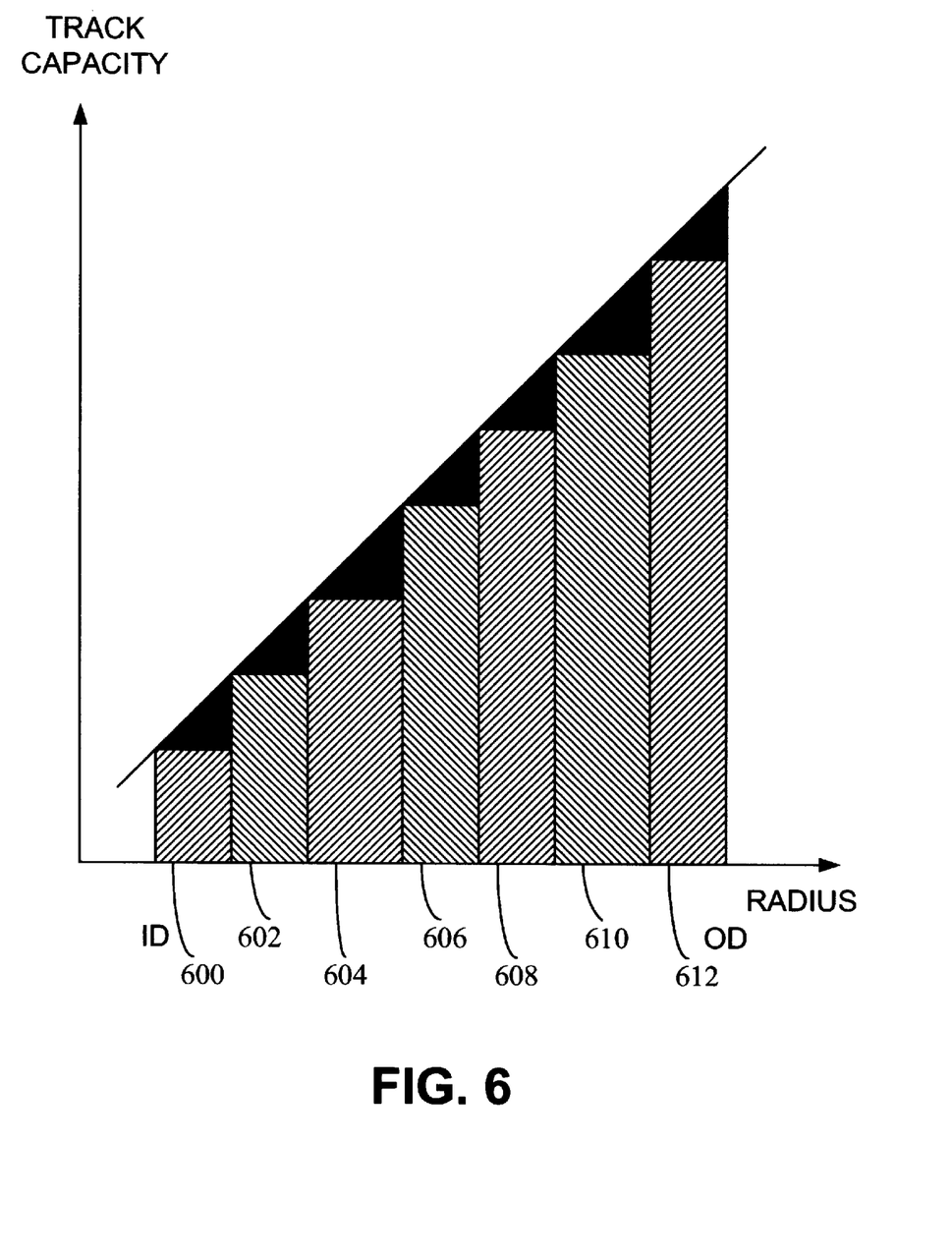
FIG. 6 is a graph of one embodiment of track capacity versus recording disk radius, in accordance with the present invention.

Referring now to FIG. 6, one embodiment of track 500 capacity versus recording disk 100 radius is shown, in accordance with the present invention. The circumference of tracks 500 on recording disk 100 increases directly with radius. In other words, tracks 500 on the outer diameter of recording disk 100 are physically longer than tracks 500 on the inner diameter of recording disk 100. Data for a particular track 500 may be stored and retrieved at a constant clock rate, that is, so many bits per second, to simplify data storage system circuitry. However, using a constant clock rate means that the data density in terms of stored bits per inch of track 500 length declines with increasing recording disk 100 radius. The use of a constant clock rate scheme for the entire recording disk 100 thus does not maximize data storage capacity.

In one embodiment, recording disk 100 is therefore divided into a number of discrete zones, which are groups of adjacent tracks 500 having similar data densities. Exemplary zones 600, 602, 604, 606, 608, 610, and 612 are shown in FIG. 6. Zones are numbered sequentially from the recording disk 100 center outward. Data for all tracks 500 within each zone is stored and retrieved at a particular constant clock rate. Different zones use different clock frequencies, with each clock frequency approximately corresponding to a preferred 100 kilobits-per-inch data density. Data wedges 114 in an outer zone, like zone 612, may therefore store more total bits than data wedges 114 in a zone closer to the center of recording disk 100, such as zone 600. Use of multiple constant-clock-frequency zones exploits the storage capacity of each track 500 more effectively than use of a single clock frequency for the entire recording disk 100. In the preferred embodiment, each data sector includes 512 bytes, each track 500 is 0.7 micrometers in radial width, and each track on the recording disk includes 255 data wedges 114 and servo sectors 112.

As the bit capacity of tracks 500 in different zones increases with recording disk 100 radius, there are cases in which not all of the data wedges 114 in a given track 500 may be used, because of the need to avoid storing only a fraction of a data sector. In other words, there are leftover data wedges 512 as depicted in FIG. 5A. Each zone may be capable of storing a different number of data sectors and may have a different number of normally empty data wedges 114 available for use in case a defect 514 is present somewhere on track 500.

Figure 7A:
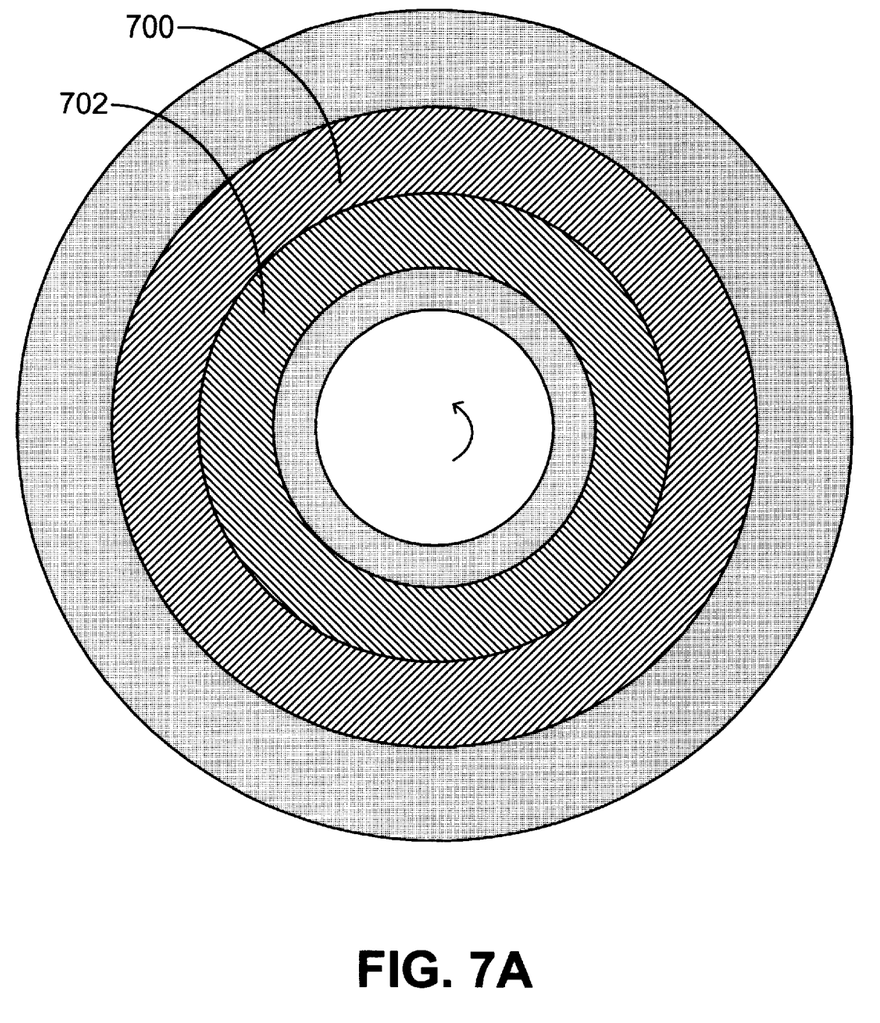
FIG. 7A is a diagram of one embodiment of the recording disk including discrete zones, in accordance with the present invention.

Referring now to FIG. 7A, one embodiment of recording disk 100, including discrete zones, is shown, in accordance with the present invention. For simplicity, only two zones 700 and 702 are shown. Each zone preferably spans a range of track numbers, has its own clock frequency, may store an integer number of data sectors, and may have a number of leftover data wedges 114 available for defect skipping. Information describing where each part of each data sector is to be written is stored in zone table 308 of the magneto-optical data storage system 210, as previously described.

Figure 7B:
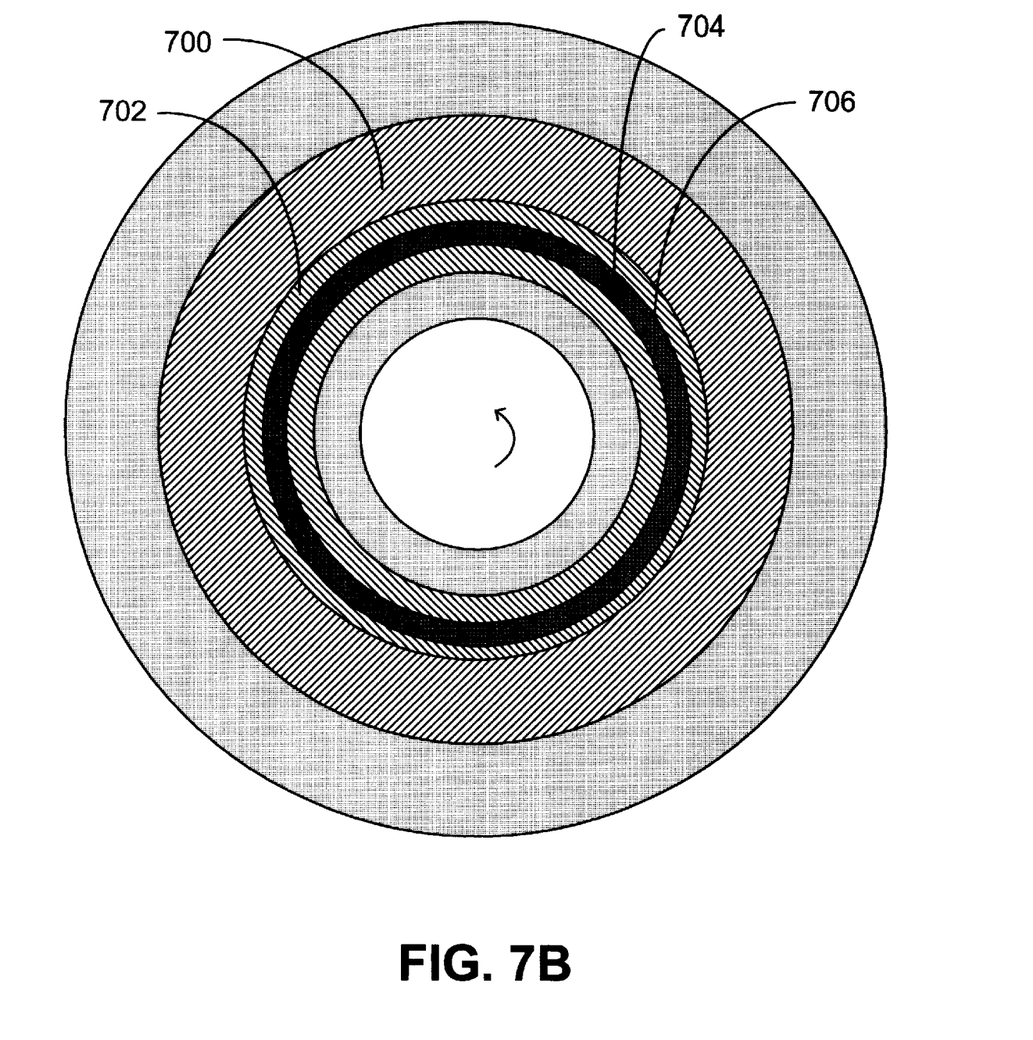
FIG. 7B is a diagram of one embodiment of the recording disk including discrete zones, a defect in a zone, and a sub-zone, in accordance with the present invention.

Referring now to FIG. 7B, one embodiment of recording disk 100 is shown, including discrete zones 700 and 702, and a defect 704 within zone 702, in accordance with the present invention. A sub-zone 706 is also shown. Defect 704 may include an actual defect known to exist at the time of manufacture, or may also include portions of recording disk 100 predicted to become defective in the future. Defects 704 are not likely to span circumferentially adjacent data wedges 114 on a particular track 500 since servo sectors 112 separate them. However, defects 704 may readily span radially adjacent tracks 500, since tracks 500 are quite narrow in the preferred embodiment, and are may become even narrower in future embodiments.

The strong correlation between the various neighboring tracks 500 adversely affected by defect 704 enables efficient storage of many defect 704 locations in zone table 308. Defect 704 group location descriptions, instead of individual defect 704 location descriptions, may be stored in zone table 308 by defining a sub-zone 706. Each sub-zone 706 spans a number of radially adjacent tracks 500 including the same defective data wedges 114. Sub-zone 706 uses the same clock frequency and includes the same number of data sectors as zone 702, but tracks 500 in sub-zone 706 are known to be marred by defect 704 at a particular data wedge 114 location. Many individual defect 704 locations may thus be summarized in a single sub-zone 706 entry in zone table 308, thereby reducing zone table 308 size significantly. Further, the logical to physical address calculation may be made more quickly by search engine 306 because the same defect 704 need not be repeatedly counted on different tracks 500.

Figure 7C:
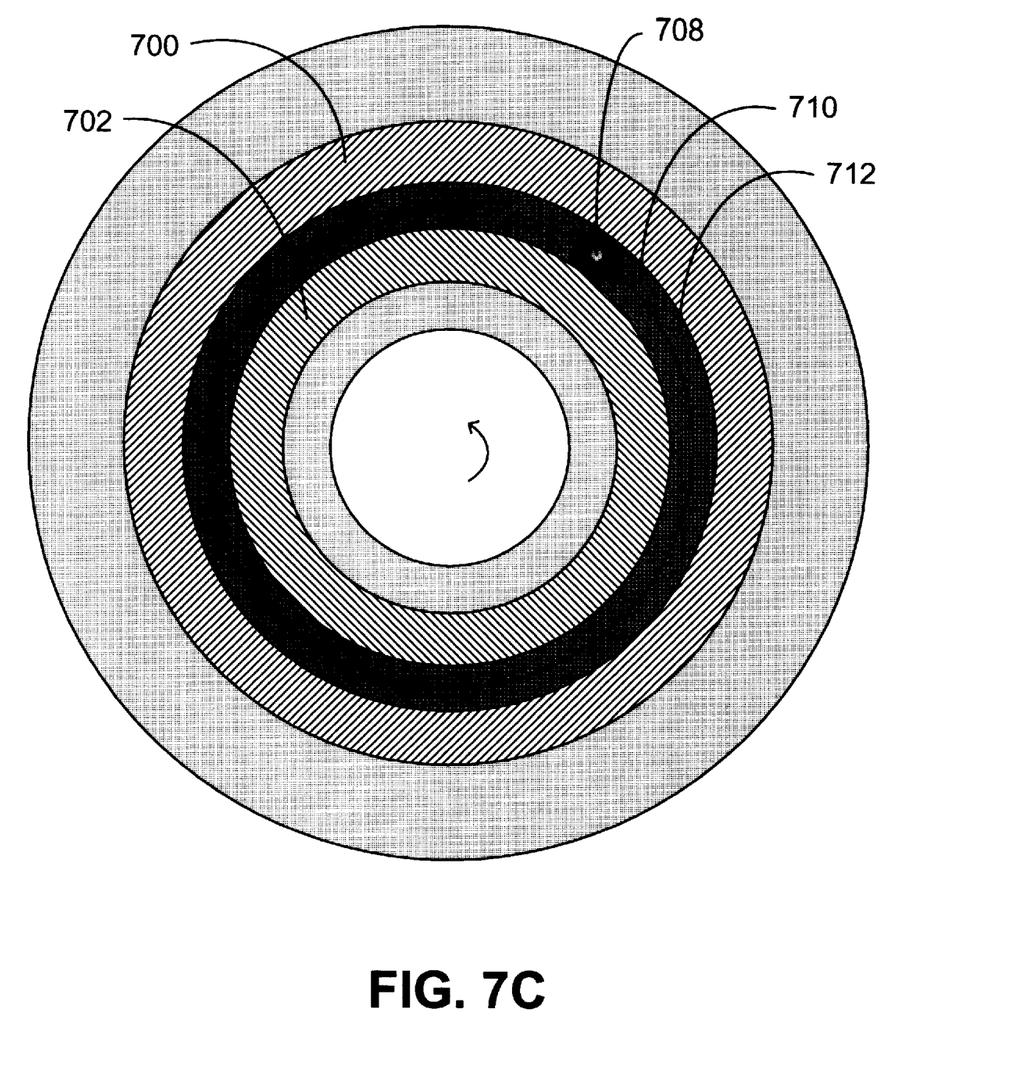
FIG. 7C is a diagram of one embodiment of the recording disk including discrete zones, a defect spanning two zones, and two sub-zones, in accordance with the present invention.

Referring now to FIG. 7C, one embodiment of recording disk 100 is shown, in accordance with the present invention, including discrete zones 700 and 702, and a defect 708 spanning zones 700 and 702, and two sub-zones 710 and 712. Portions of two radially adjacent zones are marred by defect 708, so two sub-zones are required to efficiently store defect 708 group locations. Sub-zone 710 uses the same clock frequency and includes the same number of data sectors as zone 700, and sub-zone 712 uses the same clock frequency and includes the same number of data sectors as zone 702. Many defects 708 may occur in a particular zone 700, but any defective physical address may be skipped because zone table 308 has information regarding all data wedges 114 on all tracks 500, whether stored individually or by group.

Figure 8:
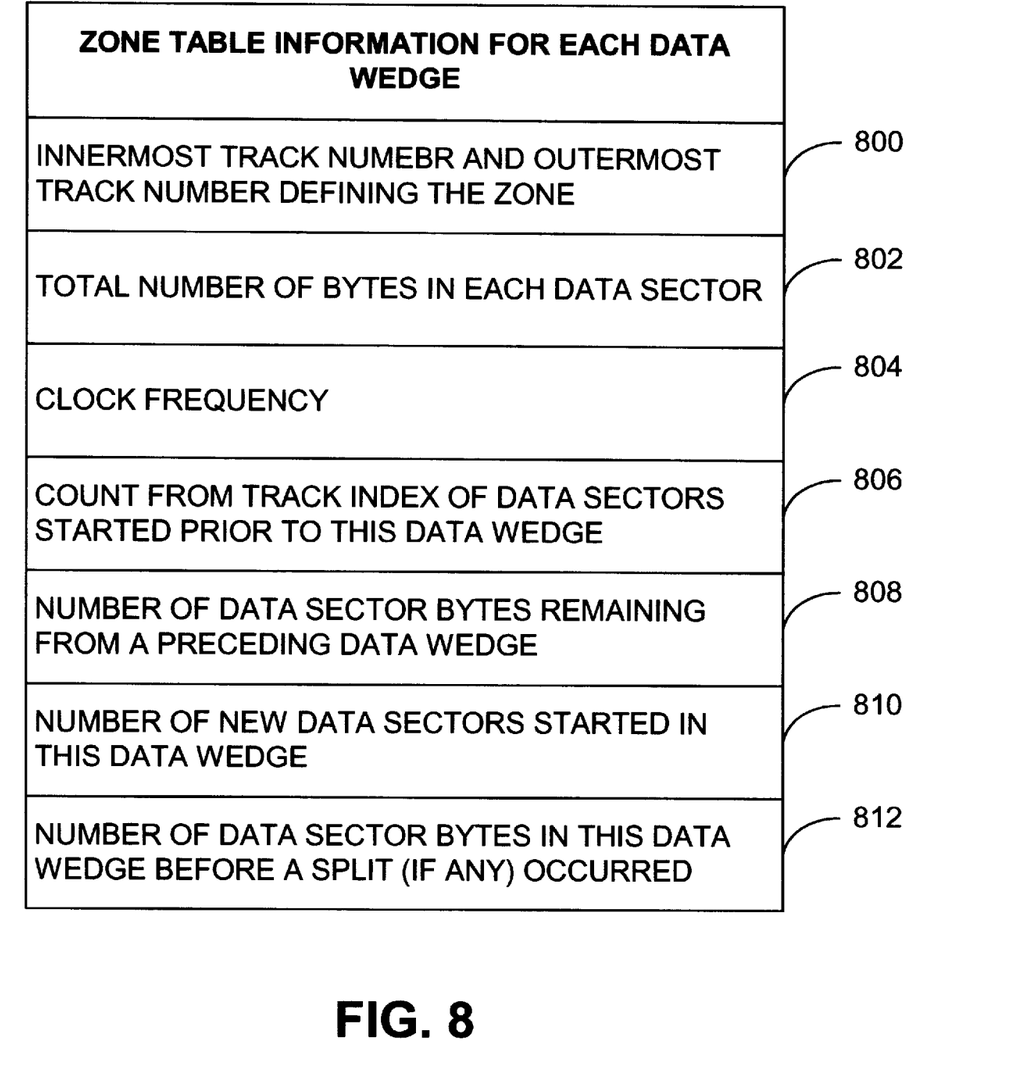
FIG. 8 is a table of one embodiment of zone table contents, in accordance with the present invention.

Referring now to FIG. 8, one embodiment of zone table 308 contents is shown, in accordance with the present invention. Several different pieces of information are stored for each data wedge 114 in each zone 700 (or sub-zone 710). The innermost and outermost track 500 numbers defining zone 700 in which data wedge 114 exists, the total number of bytes in each data sector (512 in the preferred embodiment), and the clock frequency of zone 700 are all stored in zone table 308. Additional information used to efficiently store data in a particular track 500 includes the number of data sectors started prior to a particular data wedge 114, the number of new data sectors started in a particular data wedge 114, the number of data sector bytes remaining to be written from a preceding data wedge 114, and the number of data sector bytes stored in a particular data wedge 114 before a split 406 occurred. Defective data wedges 114 may be denoted by zeroes in some of these latter fields. Zone table 308 information is used by magneto-optical data storage system 210 to best use available non-defective data wedges 114 to maximize the track 500 packing fraction.

Figure 9:
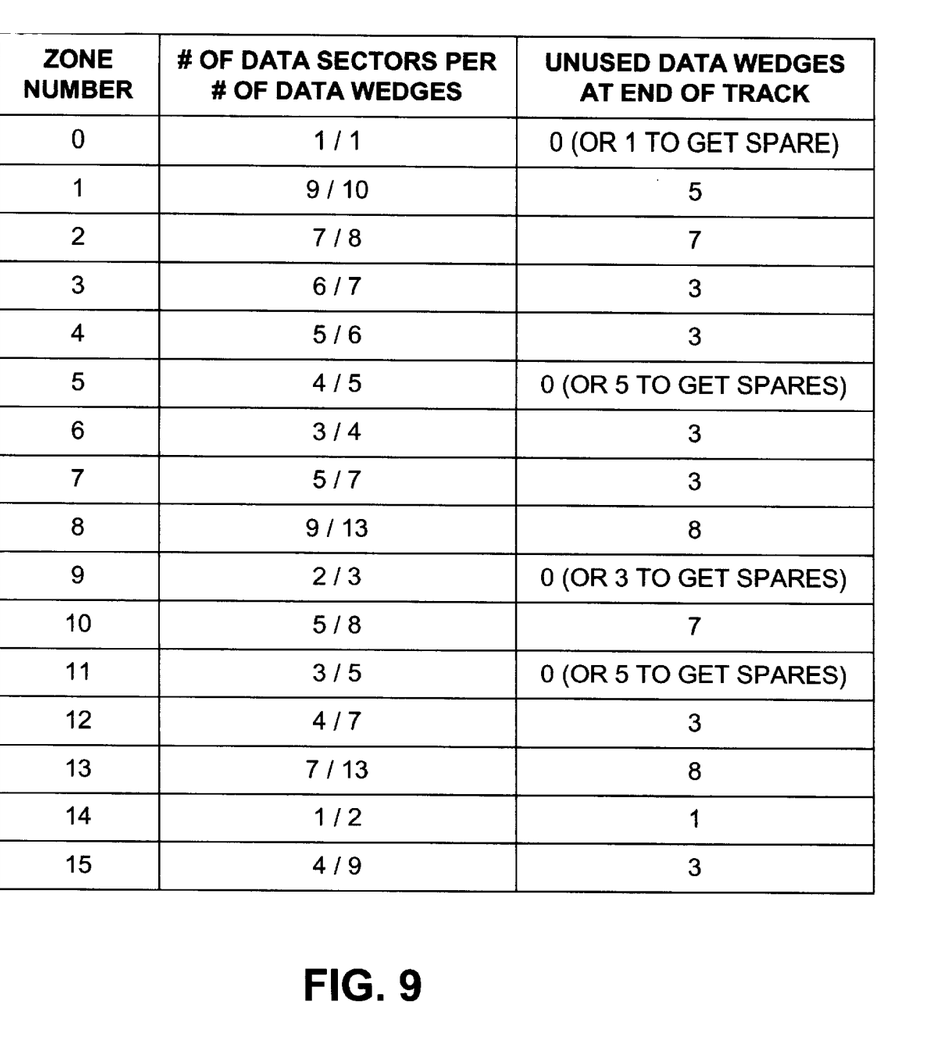
FIG. 9 is a table of one embodiment of data wedge utilization, in accordance with the present invention.

Referring now to FIG. 9, a table of one embodiment of data wedge 114 utilization is shown, in accordance with the present invention. For each zone 700 on recording disk 100, an integer number of total data sectors are preferably stored across an integer number of total data wedges 114. Note that splits 406 may occur in some data wedges 114 to accomplish such storage. Each zone 700 also has a number of unused data wedges 114 at the end of each track 500 available for use as spares for defect 708 skipping. Note that in the preferred embodiment, only four zones 700 (zone numbers 0, 5, 9, and 11) need to be modified to create unused data wedges 114 because an integer number of data sectors will otherwise completely fill tracks 500 in those zones 700.

The foregoing modification of zones to create unused data wedges 114 may be done for only a range of tracks 500 that include a defect 708. Changing the number of data sectors per track 500 in the "sub-zones" to which spare data wedges 114 have been added effectively divides the four zones 700 into several zones 700 for addressing purposes. This addressing complexity may be avoided by keeping the number of data sectors per track 500 the same for every track 500 in zone 700. Either adding spare data wedges 114 to all tracks 500 in zone 700, or simply electing not to use the data wedge 114 skipping method in these zones 700, keeps the number of data sectors per track 500 the same for every track 500 in zone 700. In the preferred embodiment, the skipping of defective data wedges 114 more than compensates for the addition of unused data wedges 114 in the four zones 700 described.

Figure 10:
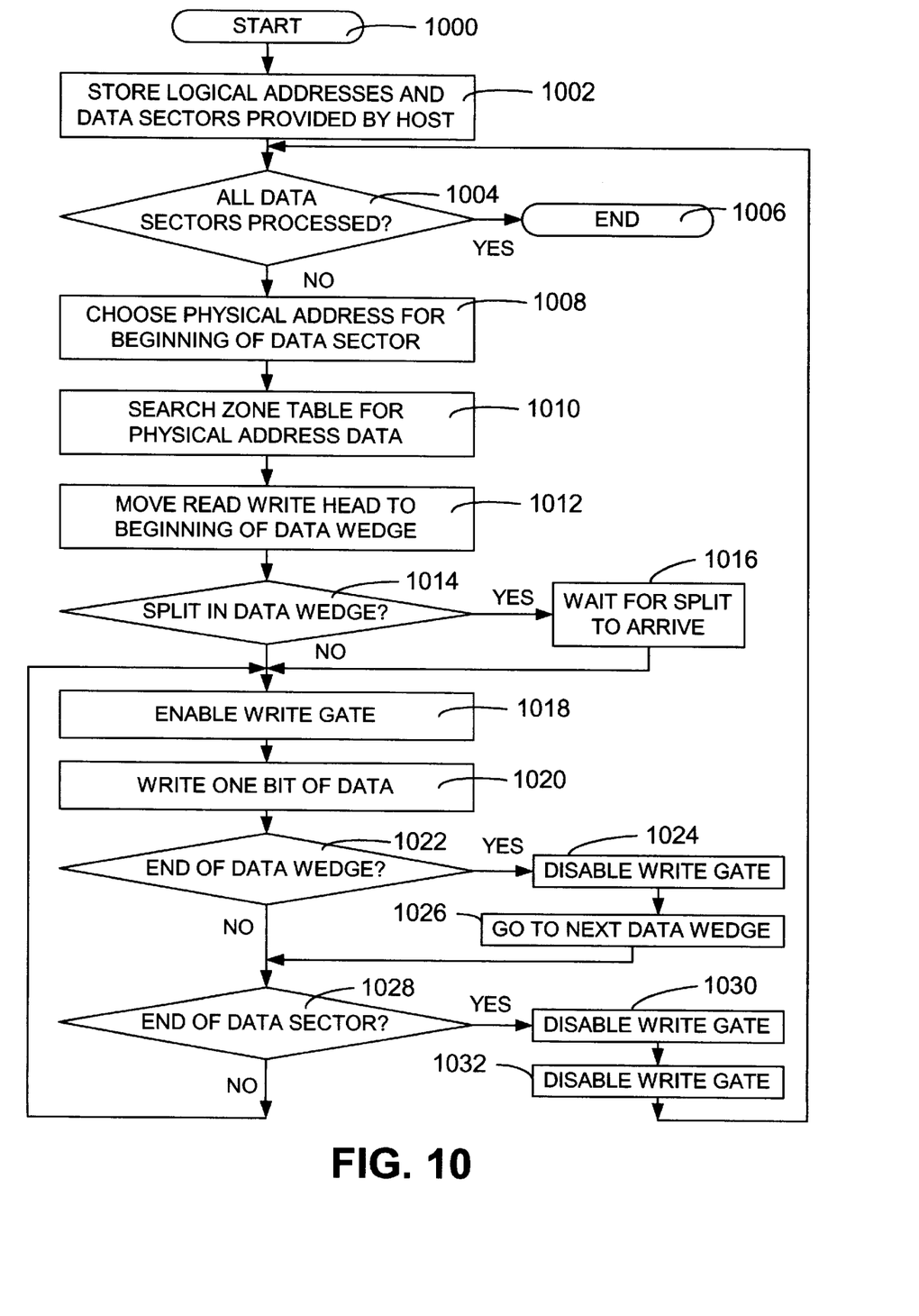
FIG. 10 is a flowchart of one embodiment of magneto-optical data storage method steps, in accordance with the present invention.

Referring now to FIG. 10, a flowchart of one embodiment of magneto-optical data storage method steps is shown, in accordance with the present invention. In step 1000, the host computer sends a command, preferably via SCSI interface 300, to write data to magneto-optical data storage system 210. The command thereby starts the data storage method sequence. Next, in step 1002, SCSI interface 300 stores the logical address and contents of each data sector to be written into memory 302. In step 1004, microprocessor 304 scans memory 302 to determine whether all data sectors have been processed. If all data sectors have been processed, then the data storage sequence ends at step 1006.

If data sectors have not all been processed, then, in step 1008, microprocessor 304 chooses an intended physical address at which storage of each data sector is to begin. However, since there may be defects 708 on the recording disk 100 surface, some intended data wedges 114 may be unsuitable for use. Thus, in step 1010, search engine 306 scans zone table 308 and returns the physical address of a serviceable data wedge 114 to microprocessor 304. The contents of zone table 308 are preferably determined at the time of magneto-optical data storage system 210 manufacture so that all defective data wedges 114 may be identified and subsequently skipped in this manner, to eliminate the need for read-after-write data verification delays.

Next, in step 1012, microprocessor 304 preferably transfers the physical address to read/write controller 310, which responsively orders servo controller 312 to move read/write head 102 on the appropriate recording disk 100 to the beginning of serviceable data wedge 114 identified in foregoing step 1010. In step 1014, read/write controller 310 determines, from zone table 308 information, whether a split 406 exists in data wedge 114. In step 1016, if a split 406 exists in data wedge 114, then read/write controller 310 waits for split 406 to reach read/write head 102. If no split 406 exists in data wedge 114, then servo controller 312 has successfully moved read/write head 102 into position at the desired spot on recording disk 100.

In step 1018, read/write controller 310 preferably sets write gate signal 314 to a value that enables writing to begin. In step 1020, one bit of data is written by magneto-optical data storage system 210. In step 1022, read/write controller 310 determines whether the end of data wedge 114 has been reached. If the end of data wedge 114 is reached, then in step 1024 read/write controller 310 disables write gate signal 314, and, in step 1026, commands servo controller 312 to move read/write head 102 to the next data wedge 114.

However, If the end of data wedge 114 has not been reached, then, in step 1028, read/write controller 310 determines whether the end of a data sector has been reached. If the end of a data sector has been reached, then, in step 1030, read/write controller 310 disables write gate signal 314, and in step 1032, microprocessor 304 updates zone table 308 to note the presence of newly-written data before the FIG. 10 process returns to step 1004. Alternatively, if the end of a data sector has not been reached, then the FIG. 10 process returns to step 1018 to continue writing data.

The sequence of method steps for reading data is analogous to the sequence of method steps for writing data described above, but, in steps 1018, 1024, and 1030, read/write controller 310 uses read gate signal 316 instead of write gate signal 314, and, in step 1032, microprocessor 304 does not update zone table 308.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. An apparatus for managing defects in a memory device, comprising:
    a zone table that stores physical address information, wherein sub-zones are defined in the zone table to facilitate the storage of defect group locations, instead of individual defect locations, the defect group locations consisting of radially adjacent tracks to an individual defect location;
    a search engine configured to search said zone table to identify defective physical addresses; and
    a read/write controller that avoids said defects in response to said defective physical addresses.

2. The apparatus of claim 1 wherein unused data wedges replace defective data wedges.

3. The apparatus of claim 2 wherein said defects are avoided by skipping said defective data wedges and shifting data storage to non-defective data wedges.

4. The apparatus of claim 2 wherein a track includes an integer number of data sectors stored in an integer number of said data wedges.

5. The apparatus of claim 4 wherein said read/write controller accesses splits in said data wedges using said physical address information.

6. The apparatus of claim 2 wherein the number of data sectors stored in a track is chosen to provide said unused data wedges in said track.

7. The apparatus of claim 6 wherein nominal radial track pitch is 0.7 micrometers.

8. The apparatus of claim 6 wherein said track includes 255 said data wedges and 255 servo sectors.

9. The apparatus of claim 6 wherein said data sector includes 512 bytes.

10. The apparatus of claim 1 wherein physical addresses described by said physical address information are distributed over multiple zones each having different clock frequencies and similar data densities.

11. The apparatus of claim 10 wherein nominal data density is 100 kilobits-per-inch.

12. The apparatus of claim 10 wherein ratios of a number of data sectors per a number of data wedges in said multiple zones are 1/1, 9/10, 7/8, 6/7, 5/6, 4/5, 3/4, 5/7, 9/13, 2/3, 5/8, 3/5, 4/7, 7/13, 1/2, and 4/9.

13. The apparatus of claim 1 wherein said memory device is a magneto-optical data storage system.

14. The apparatus of claim 1 wherein read-after-write verification delays are eliminated.

15. The apparatus of claim 1 wherein said physical address information includes:
    a range of tracks included in a zone;
    a number of bytes stored in a data sector;
    a zone clock frequency;
    a count from an index of said data sectors started prior to a data wedge;
    a count of new data sectors started in said data wedge;
    a count of data sector bytes in said data wedge before a split; and
    a count of said data sector bytes remaining from a preceding data wedge.

16. The apparatus of claim 1 wherein said defects include both present and predicted unreliable portions of a recording medium.

17. The apparatus of claim 1 wherein said physical address information is stored for every data wedge in a recording medium.

18. The apparatus of claim 1 wherein a microprocessor updates said physical address information in said zone table after data storage.

19. The apparatus of claim 1 wherein said read/write controller triggers a servo controller to align a read/write head with a specific track and to position said read/write head at a particular location in a selected data wedge, and thereafter a write gate signal responsively enables writing and a read gate signal responsively enables reading.

20. A method for managing defects in a memory device, comprising the steps of:
    storing physical address information in a zone table, wherein sub-zones are defined in the zone table to facilitate the storage of defect group locations, instead of individual defect locations, the defect group locations consisting of radially adjacent tracks to an individual defect location;
    searching said zone table for defective physical addresses with a search engine; and
    avoiding defects in response to said defective physical addresses with a read/write controller.

21. The method of claim 20 wherein unused data wedges replace defective data wedges.

22. The method of claim 21 wherein said defects are avoided by skipping said defective data wedges and shifting data storage to non-defective data wedges.

23. The method of claim 21 wherein a track includes an integer number of data sectors stored in an integer number of said data wedges.

24. The method of claim 23 wherein said read/write controller accesses splits in said data wedges using said physical address information.

25. The method of claim 21 wherein the number of data sectors stored in a track is chosen to provide unused data wedges in said track.

26. The method of claim 25 wherein nominal radial track pitch is 0.7 micrometers.

27. The method of claim 25 wherein said track includes 255 said data wedges and 255 servo sectors.

28. The method of claim 25 wherein said data sector includes 512 bytes.

29. The method of claim 20 wherein physical addresses described by said physical address information are distributed over multiple zones each having different clock frequencies and similar data densities.

30. The method of claim 29 wherein nominal data density is 100 kilobits-per-inch.

31. The method of claim 29 wherein ratios of a number of data sectors per a number of data wedges in said multiple zones are 1/1, 9/10, 7/8, 6/7, 5/6, 4/5, 3/4, 5/7, 9/13, 2/3, 5/8, 3/5, 4/7, 7/13,1/2, and 4/9.

32. The method of claim 20 wherein said memory device is a magneto-optical data storage system.

33. The method of claim 20 wherein read-after-write verification delays are eliminated.

34. The method of claim 20 wherein said physical address information includes:
   a range of tracks included in a zone;
   a number of bytes stored in a data sector;
   a zone clock frequency;
   a count from an index of said data sectors started prior to a data wedge;
   a count of new data sectors started in said data wedge;
   a count of data sector bytes in said data wedge before a split; and
   a count of said data sector bytes remaining from a preceding data wedge.

35. The method of claim 20 wherein said defects include both present and predicted unreliable portions of a recording medium.

36. The method of claim 20 wherein said physical address information is stored for every data wedge in a recording medium.

37. The method of claim 21 wherein a microprocessor updates said physical address information in said zone table after data storage.

38. The method of claim 20 wherein said read/write controller triggers a servo controller to align a read/write head with a specific track and to position said read/write head at a particular location in a selected data wedge, and thereafter a write gate signal responsively enables writing and a read gate signal responsively enables reading.

39. A defect management system encoded in computer-readable form which has been embodied in a tangible medium of information storage, in accordance with the following steps:
   storing physical address information in a zone table, wherein sub-zones are defined in the zone table to facilitate the storage of defect group locations, instead of individual defect locations, the defect group locations consisting of radially adjacent tracks to an individual defect location;
   searching said zone table for defective physical addresses with a search engine; and
   avoiding defects in response to said defective physical addresses.

* * * * *